United States Patent Office.

DANIEL FOBES, OF BOSTON, MASSACHUSETTS, ASSIGNOR TO FOBES, HAYWARD & COMPANY, OF THE SAME PLACE.

Letters Patent No. 64,856, dated May 21, 1867.

IMPROVED EDIBLE COMPOSITION.

The Schedule referred to in these Letters Patent and making part of the same.

TO ALL PERSONS TO WHOM THESE PRESENTS SHALL COME:

Be it known that I, DANIEL FOBES, of Boston, in the county of Suffolk, and State of Massachusetts, have invented a new and useful Edible Composition, to be used either for making a beverage or for coating articles of confectionery; and I do hereby declare the same to be fully described in the following specification.

The constituents of my said edible composition are the roasted seeds of the *Coffæa Arabica* in a powdered or ground state, and the torrefied seeds of the *Theobroma cacao*, also in a ground or powdered state, or the simple butter of such.

In compounding the composition I mix together equal or unequal quantities of the constituents, as circumstances may require, and when necessary I add to the mixture a quantity of the butter of cacao, the whole being ground or reduced to a paste, or brought to a liquid state by means of heat or otherwise. I also form the composition by combining or mixing the ground and roasted seeds of the *Coffæa Arabica* with the butter of the cacao.

The composition may be made into cakes or tablets to be eaten, or it may be mixed with water or milk and used as a beverage, or it may be used to coat the surfaces of articles of confectionery, or it may be employed for various other uses.

I claim the edible composition, as made of the materials, in the manner, and for the purpose substantially as described.

DANIEL FOBES.

Witnesses:
R. H. EDDY,
F. P. HALE. Jr.